(12) United States Patent
Oh et al.

(10) Patent No.: US 11,003,215 B2
(45) Date of Patent: May 11, 2021

(54) DISPLAY DEVICE

(71) Applicant: Samsung Display Co., Ltd., Yongin-Si (KR)

(72) Inventors: Young Eun Oh, Hwaseong-si (KR); Sodam Ahn, Yongin-si (KR); Sunhaeng Cho, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/724,814

(22) Filed: Dec. 23, 2019

(65) Prior Publication Data
US 2020/0225704 A1 Jul. 16, 2020

(30) Foreign Application Priority Data

Jan. 10, 2019 (KR) .................. 10-2019-0003379

(51) Int. Cl.
*G06F 1/16* (2006.01)
*G09F 9/30* (2006.01)

(52) U.S. Cl.
CPC .......... *G06F 1/1641* (2013.01); *G06F 1/1652* (2013.01); *G06F 1/1692* (2013.01); *G09F 9/301* (2013.01)

(58) Field of Classification Search
CPC .... G06F 1/1641; G06F 1/1652; G06F 1/1692; G06F 3/0412; G09F 9/301; G09F 9/33; H04M 1/0268; G02B 1/18
See application file for complete search history.

(56) References Cited

U.S. PATENT DOCUMENTS

| | | | |
|---|---|---|---|
| 10,191,516 B2 | 1/2019 | Jang et al. | |
| 2014/0272355 A1* | 9/2014 | Sirois | G02B 1/10 428/216 |
| 2014/0287213 A1* | 9/2014 | Lee | B32B 5/142 428/217 |
| 2015/0266272 A1 | 9/2015 | Lee et al. | |
| 2016/0271914 A1* | 9/2016 | Xie | H01L 51/0097 |
| 2017/0045914 A1* | 2/2017 | Namkung | G06F 1/1652 |
| 2017/0156227 A1* | 6/2017 | Heo | H05K 5/0017 |
| 2018/0053451 A1* | 2/2018 | Han | G09F 9/301 |
| 2019/0025886 A1 | 1/2019 | Ryu et al. | |

FOREIGN PATENT DOCUMENTS

| | | |
|---|---|---|
| KR | 10-2015-0108991 | 10/2015 |
| KR | 10-2016-0117799 | 10/2016 |
| KR | 10-2017-0073304 | 6/2017 |
| KR | 10-2017-0113792 | 10/2017 |
| KR | 10-2018-0062273 | 6/2018 |

* cited by examiner

*Primary Examiner* — Abhishek M Rathod
(74) *Attorney, Agent, or Firm* — F. Chau & Associates, LLC

(57) ABSTRACT

A display device including: a display panel configured to be folded about a first bending axis; a window member disposed on the display panel, the window member including a transparent material; and a functional layer disposed on the window member, the functional layer including a hydrophobic material and a first opening at a region corresponding to the first bending axis.

19 Claims, 12 Drawing Sheets

DISPLAY DEVICE

CROSS-REFERENCE TO RELATED APPLICATION

This U.S. non-provisional patent application claims priority under 35 U.S.C. § 119 to Korean Patent Application No. 10-2019-0003379 filed on Jan. 10, 2019, in the Korean Intellectual Property Office, the disclosure of which is incorporated by reference herein in its entirety.

TECHNICAL FIELD

The present inventive concept relates to a foldable display device, and in particular, to a foldable display device having an anti-fingerprint layer.

DISCUSSION OF RELATED ART

A display device is an output device for the presentation of information in visual form. In general, the display device displays information within a display screen. Flexible display devices are electronic visual displays which are flexible in nature. Unlike a rigid or traditional display device, the flexible display device can be folded, rolled, or bent. Due to its changeable shape, the flexible display device can be easily carried by a user.

To protect a display surface of a portable display device, an additional protection film is often attached to the display surface by a user. For example, the owner of a smart phone may apply a screen cover to the phone's display surface.

However, since stress is repeatedly exerted on a folding portion of a flexible display device, a portion of the additionally-attached protection film may be detached from a surface of the display device.

SUMMARY

According to an exemplary embodiment of the inventive concept, a display device may include a display panel, a window member, and a functional layer. The display panel may be folded about a first bending axis. The window member may be disposed on the display panel and may include a transparent material. The functional layer may be disposed on the window member and may include a hydrophobic material. The functional layer may include a first opening at a region corresponding to the first bending axis.

In an exemplary embodiment of the inventive concept, the hydrophobic material may be a fluorine compound.

In an exemplary embodiment of the inventive concept, the display device may further include a hard coating layer between the functional layer and the window member, wherein the hard coating layer includes polyimide.

In an exemplary embodiment of the inventive concept, the first opening may have a width given by the following mathematical formula: $\pi \times R1+4$ mm $\leq WD1 \leq \pi \times R1+8$ mm, where WD1 is the width of the first opening, R1 is a first curvature radius of a portion of the display panel adjacent to the first bending axis when the display panel is folded about the first bending axis, and lengths of R1 and WD1 are in millimeters.

In an exemplary embodiment of the inventive concept, the display panel may be configured to be folded about a second bending axis spaced apart from the first bending axis. The functional layer further includes a second opening at a region corresponding to the second bending axis.

In an exemplary embodiment of the inventive concept, the display panel, which is folded about the first bending axis, may have a first curvature radius near the first bending axis, and the display panel, which is folded about the second bending axis, may have a second curvature radius near the second bending axis. The first opening and the second opening may have first width and second width, respectively, which are given by mathematical formulae of $\pi \times R1+4$ mm $\leq WD1 \leq \pi \times R1+8$ mm and $\pi \times R2+4$ mm $\leq WD2 \leq \pi \times R2+8$ mm, where R1 is the first curvature radius in millimeters, R2 is the second curvature radius in millimeters, WD1 is the first width in millimeters and WD2 is second width in millimeters.

In an exemplary embodiment of the inventive concept, the second curvature radius may be larger than the first curvature radius, and the second width may be larger than the first width.

In an exemplary embodiment of the inventive concept, the display panel may include an organic light emitting element.

In an exemplary embodiment of the inventive concept, the display device may further include an input-sensing circuit, which is disposed between the display panel and the window member and is configured to sense a touch event applied from outside the display device. The functional layer may provide a touch surface at which the touch event occurs.

In an exemplary embodiment of the inventive concept, the display device may further include an impact absorption member disposed below the display panel.

According to an exemplary embodiment of the inventive concept, a display device may include a display panel, a window member, and a functional layer.

In an exemplary embodiment of the inventive concept, the display panel may include a first display region, a second display region extended from a first side of the first display region, and a third display region extended from a second side of the first display region opposite the first side and may be folded about a first bending axis between the first display region and the second display region and about a second bending axis between the first display region and the third display region.

In an exemplary embodiment of the inventive concept, the window member may be disposed on the display panel and may include a transparent material.

In an exemplary embodiment of the inventive concept, the functional layer may be disposed on the window member and may include a hydrophobic material. The functional layer may include a first portion overlapped with the first display region, a second portion overlapped with the second display region, and a third portion overlapped with the third display region. The functional layer may not be overlapped with the first bending axis and the second bending axis.

In an exemplary embodiment of the inventive concept, the display device may further include an input-sensing circuit disposed between the display panel and the window member to sense a touch even caused by an external object. The functional layer provides a touch surface on which the touch event occurs.

In an exemplary embodiment of the inventive concept, the hydrophobic material may be a fluorine compound.

In an exemplary embodiment of the inventive concept, the display device may further include a hard coating layer disposed between the functional layer and the window member, wherein the hard coating layer may include polyimide.

In an exemplary embodiment of the inventive concept, the display panel may be folded at a first curvature radius about the first bending axis and folded at a second curvature radius, which is larger than the first curvature radius, about the second bending axis, the first portion of the functional layer and the second portion of the functional layer may be spaced apart from each other by a first distance, and the first portion of the functional layer and the third portion of the functional layer may be spaced apart from each other by a second distance larger than the first distance.

In an exemplary embodiment of the inventive concept, the first distance may satisfy following formula 1, and the second distance may satisfy following formula 2, [Formula 1] $\pi \times R1+4$ mm $\leq WD1 \leq \pi \times R1+8$ mm, where R1 is a first curvature radius in mm and WD1 is the first distance in mm, [Formula 2] $\pi \times R2+4$ mm $\leq WD2 \leq \pi \times R2+8$ mm, where R2 is a second curvature radius in mm and WD2 is the second distance in mm.

In an exemplary embodiment of the inventive concept, the display panel may be folded such that the first display region and the second display region face each other or such that the first display region and the third display region face each other.

In an exemplary embodiment of the inventive concept, the display panel may include an organic light emitting element.

In an exemplary embodiment of the inventive concept, the functional layer may have a thickness ranging from 1 nm to 100 nm.

In an exemplary embodiment of the inventive concept, the display device may further include an impact absorption member disposed below the display panel.

According to an exemplary embodiment of the inventive concept, a display device may include: a display panel configured to be folded about a first bending axis; a first layer disposed on the display panel, the first layer including a transparent material; and a second layer disposed on the first layer, the second layer including a hydrophobic material and a first opening overlapping the first bending axis.

In an exemplary embodiment of the inventive concept, the display panel may be further configured to be folded about a second bending axis, and the second layer may include a second opening overlapping the second bending axis.

In an exemplary embodiment of the inventive concept, a width of the first opening may be smaller than a width of the second opening.

In an exemplary embodiment of the inventive concept, the second layer may be an anti-fingerprint layer.

In an exemplary embodiment of the inventive concept, the display device may further include a hard coating layer disposed between the first layer and the second layer.

BRIEF DESCRIPTION OF THE DRAWINGS

Exemplary embodiments of the inventive concept will be more clearly understood from the following detailed description taken in conjunction with the accompanying drawings.

DETAILED DESCRIPTION OF THE EMBODIMENTS

Figure 1:
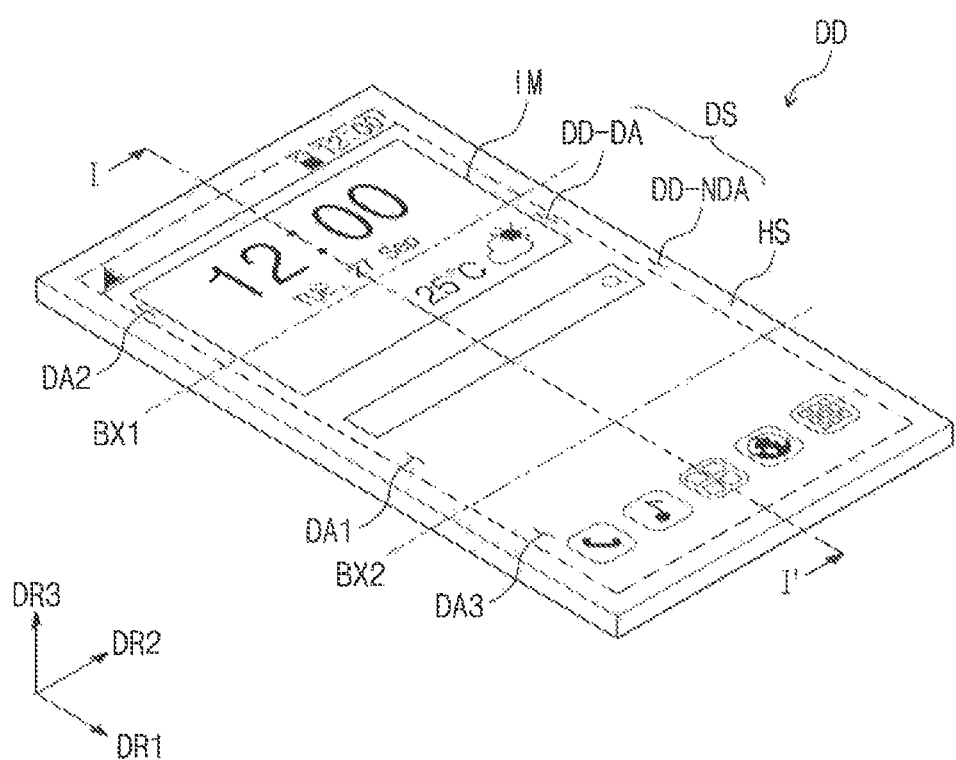
FIG. 1 is a perspective view illustrating a display device according to an exemplary embodiment of the inventive concept.

Exemplary embodiments of the inventive concept will now be described more fully with reference to the accompanying drawings. It is to be understood, however, that the inventive concept may be embodied in many different forms and should not be construed as being limited to the embodiments set forth herein. In the drawings, the thicknesses of layers and regions may be exaggerated for clarity. Like reference numerals in the drawings may denote like elements, and thus, their description may be omitted.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

FIG. 1 is a perspective view illustrating a display device DD according to an exemplary embodiment of the inventive concept. As shown in FIG. 1, the display device DD may include a display surface DS, which is used to display an image IM and is parallel to both of a first direction DR1 and a second direction DR2. Hereinafter, a third direction DR3 will refer to a direction normal to the display surface DS (e.g., a thickness direction of the display device DD). A front or top surface and a rear or bottom surface of each member described herein may be distinguished, with respect to the third direction DR3. However, directions indicated by the first direction, second direction and third direction DR1, DR2, and DR3 may be used to indicate other directions.

The display device DD may be a foldable display device. The display device DD may be used for large-sized electronic devices (e.g., television sets and monitors) or small- or medium-sized electronic devices (e.g., smart phones, tablets, car navigation systems, game machines, and smart watches).

As shown in FIG. 1, the display surface DS of the display device DD may include a plurality of regions. The display device DD may include a display region DD-DA, which is used to display the image IM, and a non-display region DD-NDA, which is adjacent to the display region DD-DA. The non-display region DD-NDA may not be used to display the image IM. As shown in FIG. 1, the image IM may be displayed in as application icons and a clock widget. The display region DD-DA may have a rectangular shape. The non-display region DD-NDA may enclose the display region DD-DA. However, the inventive concept is not limited to this example, and in certain embodiments, shapes of the display and non-display regions DD-DA and DD-NDA may be variously changed.

The display region DD-DA may include a first display region DA1, a second display region DA2, and a third display region DA3.

The first display region DA1 may be disposed between the second display region DA2 and the third display region DA3. The second display region DA2 may be extended from a first side of the first display region DA1, and the third display region DA3 may be extended from a second side of the first display region DA1. The first and second sides of the first display region DA1 may be opposite each other.

A first bending axis BX1 may be located between the first display region DA1 and the second display region DA2. A second bending axis BX2 may be located between the first display region DA1 and the third display region DA3. The first bending axis BX1 and the second bending axis BX2 may be spaced apart from each other.

FIG. 1 illustrates an example in which the display device DD has two bending axes BX1 and BX2, but the inventive concept is not limited to this example. The number of the bending axes may be changed. For example, there may be more than two bending axes.

The display device DD may include a housing HS. The housing HS may be an outer part of the display device DD and may be used to contain other components of the display device DD.

FIGS. 2A to 2E are perspective views illustrating some folding modes of the display device DD of FIG. 1.

Figure 2A:
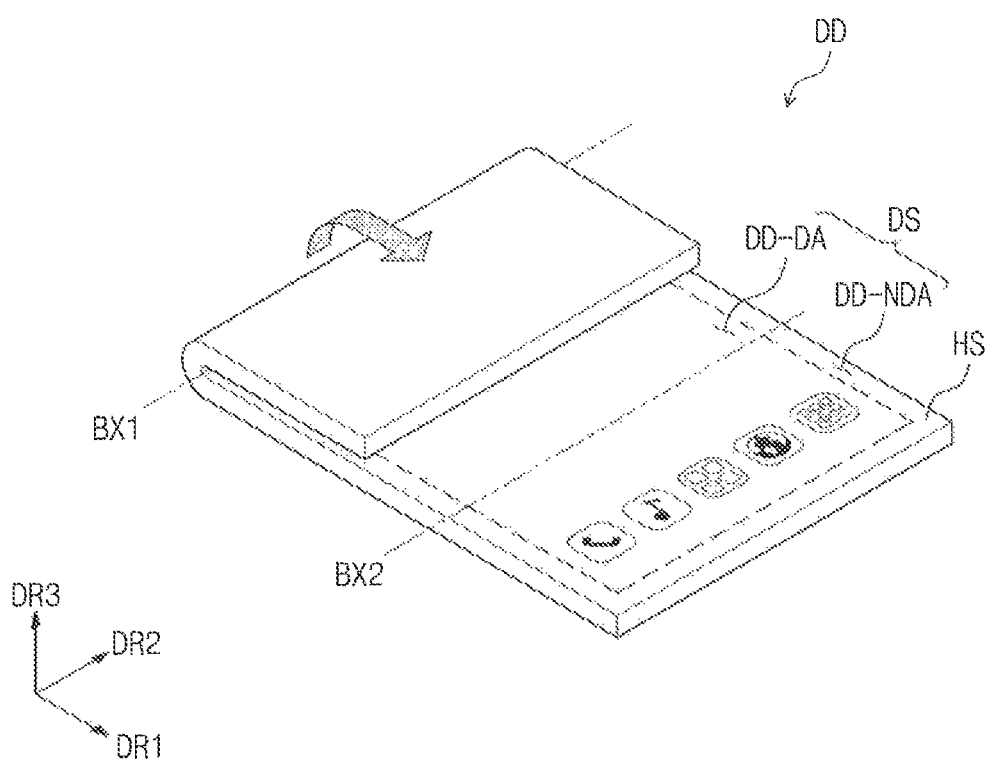
FIGS. 2A, 2B, 2C, 2D and 2E are perspective views illustrating example folding modes of the display device of FIG. 1.

Referring to FIG. 2A, the display device DD may be folded in an in-folding manner about the first bending axis BX1. In an exemplary embodiment of the inventive concept, the display device DD may be configured to be folded in only the in-folding manner, not in an out-folding manner, about the first bending axis BX1. In other words, the display device DD may be folded inward about the first bending axis BX1 to overlap an upper display half of the display device DD.

For example, in-folding may mean that the display device DD is folded in such a way that two portions of the display region DD-DA face each other, and out-folding may mean that the display device DD is folded in such a way that two portions of the display region DD-DA do not face each other.

Figure 2B:
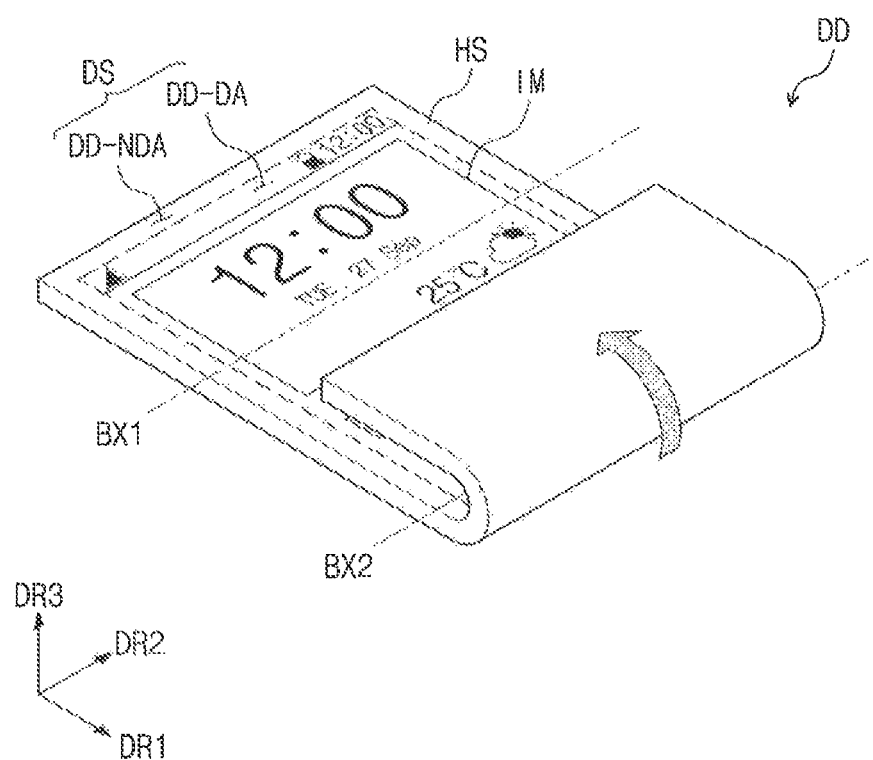
Figure 2C:
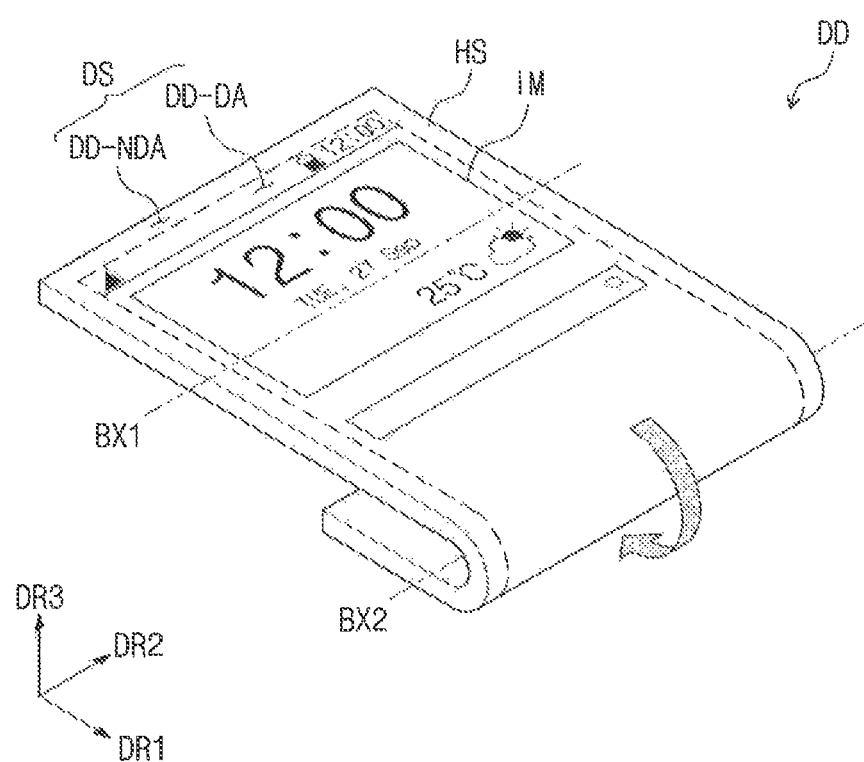

Referring to FIG. 2B, the display device DD may be folded in the in-folding manner about the second bending axis BX2. In other words, the display device DD may be folded inward about the second bending axis BX2 to overlap a lower display half of the display device DD. Referring to FIG. 2C, the display device DD may be folded in the out-folding manner about the second bending axis BX2. In other words, the display device DD may be folded outward about the second bending axis BX2 to overlap a lower non-display half of the display device DD. In reference to FIGS. 2B and 2C, the display device DD may be folded in both of the in-folding and out-folding manners about the second bending axis BX2.

Figure 2D:
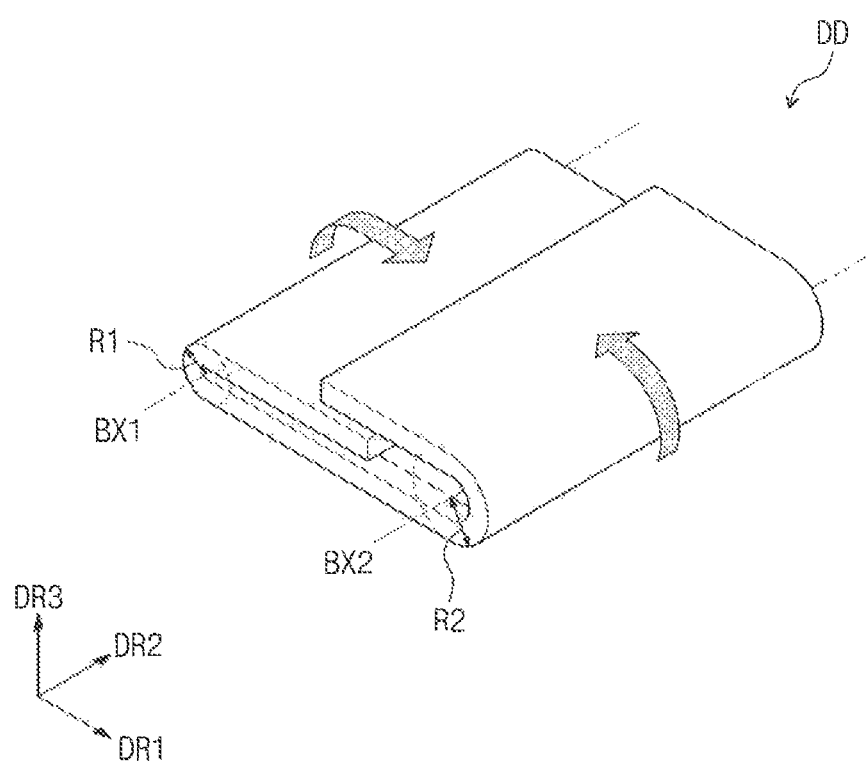

FIG. 2D illustrates an example, in which the display device DD is folded in the in-folding manner about the first bending axis BX1 and is folded in the in-folding manner about the second bending axis BX2. In this example, the length of the display DD in the first direction DR1 is decreased more than that shown in FIGS. 2A-2C.

Figure 2E:
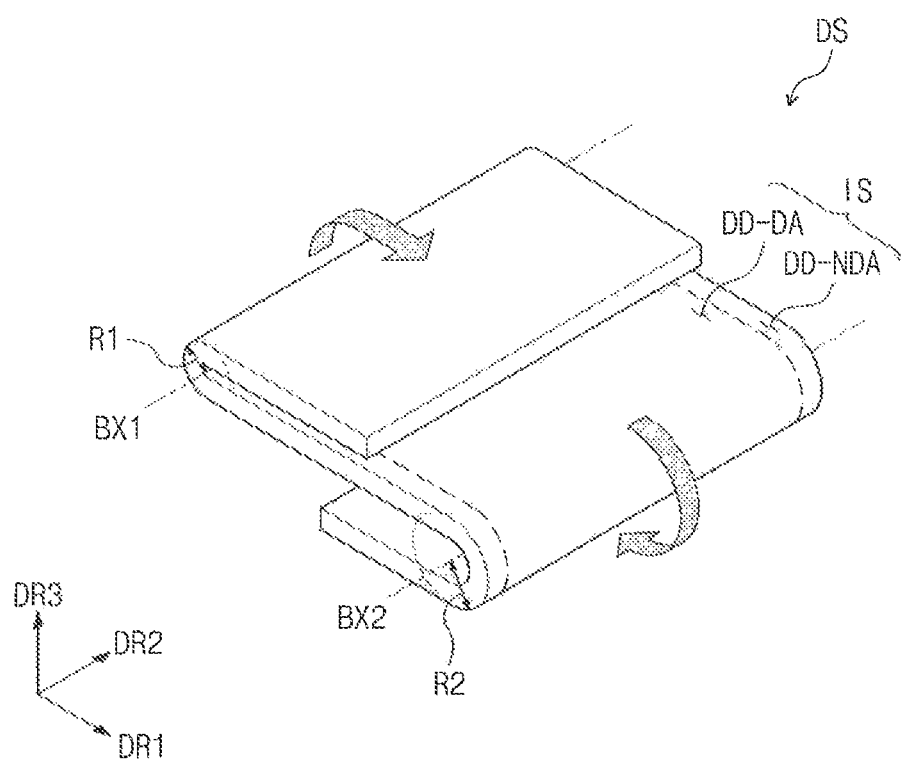

FIG. 2E illustrates an example, in which the display device DD is folded in the in-folding manner about the first bending axis BX1 and is folded in the out-folding manner about the second bending axis BX2.

Referring to FIGS. 2D and 2E, in the case of the in-folding of the display device DD about the first bending axis BX1, the display device DD may have a curvature radius R1 (hereinafter, a first curvature radius), and in the case of the in-folding of the display device DD about the second bending axis BX2, the display device DD may have a curvature radius R2 (hereinafter, a second curvature radius), which is larger than the first curvature radius R1.

In an exemplary embodiment of the inventive concept, since the display device DD is configured to allow for only the in-folding about the first bending axis BX1 and to allow for both of the in-folding and out-folding about the second bending axis BX2, a higher stress may be exerted on a portion of the display device DD corresponding to the second bending axis BX2 than compared to that exerted on a portion of the display device DD corresponding to the first bending axis BX1. According to an exemplary embodiment of the inventive concept, the second curvature radius R2 may be larger than the first curvature radius R1, thereby reducing the stress to be exerted on the portion of the display device DD corresponding to the second bending axis BX2.

FIGS. 2A to 2E illustrate some example methods of folding the display device DD, but the inventive concept is not limited to this example.

Figure 3:
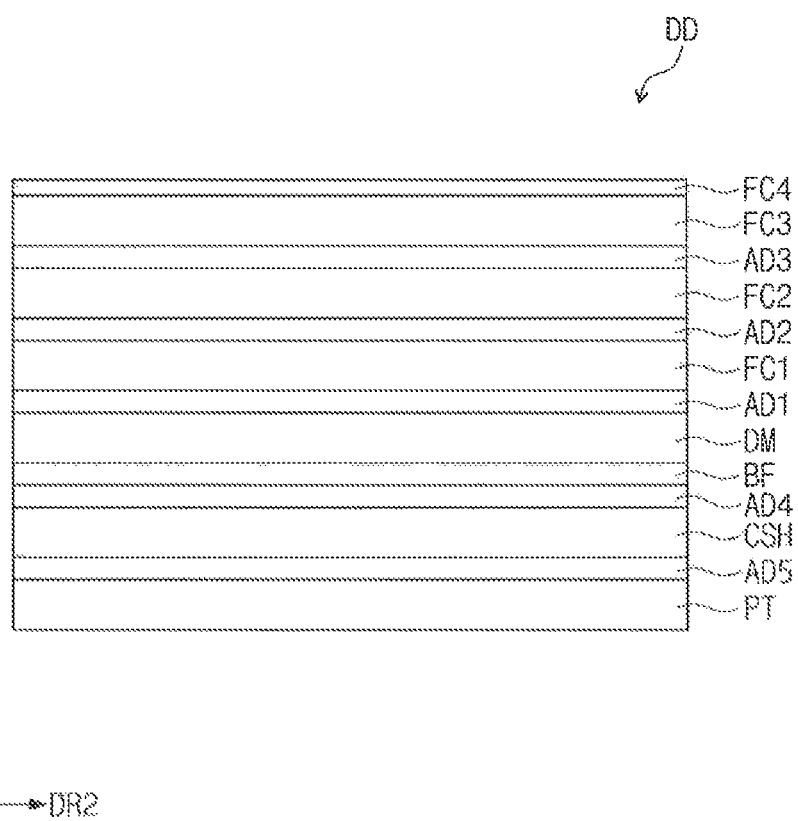
FIG. 3 is a sectional view illustrating a display device according to an exemplary embodiment of the inventive concept.
Figure 4A:
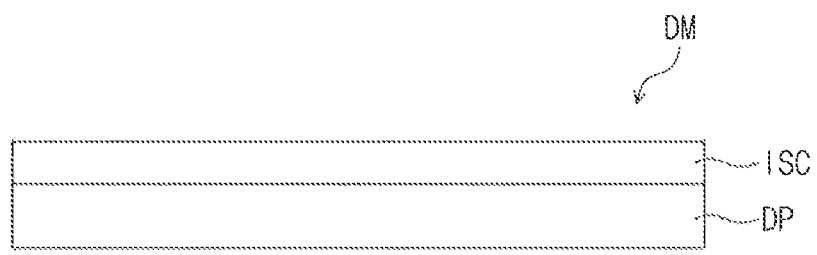
FIGS. 4A and 4B are sectional views illustrating a display module shown in FIG. 3.
Figure 4B:

FIG. 3 is a sectional view illustrating the display device DD according to an exemplary embodiment of the inventive concept. FIGS. 4A and 4B are sectional views each illustrating a display module DM or DM-1 shown in FIG. 3. FIG. 3 illustrates a section of the display device DD defined by the second direction DR2 and the third direction DR3.

The display device DD may include a display module DM, a plurality of functional layers FC1, FC2, FC3 and FC4, a base film BF, an impact absorption member CSH, a supporting member PT, and a plurality of adhesive members AD1-AD5.

In an exemplary embodiment of the inventive concept, each of the adhesive members AD1-AD5, may be a pressure sensitive adhesive (PSA).

The functional layers FC1-FC4 may be disposed on the display module DM.

A first functional layer FC1 may be attached to the display module DM by a first adhesive member AD1. For example, the first adhesive member AD1 may be disposed between the first functional layer FC1 and the display module DM. A second functional layer FC2 may be attached to the first functional layer FC1 by a second adhesive member AD2. A third functional layer FC3 may be attached to the second functional layer FC2 by a third adhesive member AD3.

A fourth functional layer FC4 may be directly disposed on the third functional layer FC3. In other words, an adhesive member may not be disposed between the fourth functional layer FC4 and the third functional layer FC3. In this case, the fourth functional layer FC4 may be formed by coating the third functional layer FC3 with the fourth functional layer FC4. However, the inventive concept is not limited to this example, and in an exemplary embodiment of the inventive concept, the fourth functional layer FC4 may be adhered to the third functional layer FC3 using an adhesive member.

Each of the first to third functional layers FC1-FC3 may include a polymeric material. Each of the first to third functional layers FC1-FC3 may be provided in the form of a film. The modulus of each of the first to third functional layers FC1-FC3 may range from 2 Gpa to 100 Gpa.

A thickness of each of the first to third functional layers FC1-FC3 may range from 35 μm to 60 μm. If the thickness of each of the first to third functional layers FC1-FC3 is less 35 μm, an initially-intended function of each functional layer may not be realized. In addition, if the thickness of each of the first to third functional layers FC1-FC3 is larger than 60 μm, the display device DD may have reduced flexibility.

In an exemplary embodiment of the inventive concept, the first functional layer FC1 may be a polarization layer for changing a polarization state of an incident light.

The second functional layer FC2 may be an impact absorption layer for absorbing an impact from the outside.

The third functional layer FC3 may have a window member including transparent material. In an exemplary embodiment of the inventive concept, the third functional layer FC3 may be formed of or include glass. In another exemplary embodiment of the inventive concept, the third functional layer FC3 may be formed of or include a synthetic resin.

The fourth functional layer FC4 may be disposed on the third functional layer FC3 and may be the outermost layer of the display device DD. The fourth functional layer FC4 may be an anti-fingerprint layer for preventing a stain caused by a user's fingerprint. The fourth functional layer FC4 will be described in more detail with reference to FIG. 9.

The base film BF, the impact absorption member CSH, and the supporting member PT may be disposed below the display module DM.

The base film BF may be directly adhered to the display module DM. In an exemplary embodiment of the inventive concept, the base film BF may include a plurality of layers.

The impact absorption member CSH may be adhered to the base film BF using a fourth adhesive member AD4. The impact absorption member CSH may include a polymeric material. The impact absorption member CSH may be a layer for absorbing an external impact.

The supporting member PT may be adhered to the impact absorption member CSH using a fifth adhesive member AD5. The supporting member PT may support the display module DM. The supporting member PT may include a hinge, which is used to fold or bend the display module DM. The supporting member PT may have a rigid property. In another exemplary embodiment of the inventive concept, the supporting member PT may be omitted.

Referring to FIG. 4A, the display module DM may include a display panel DP and an input-sensing circuit ISC. The input-sensing circuit ISC may sense a touch event and/or a change in pressure to be exerted from the outside. For example, the input-sensing circuit ISC may sense a touch event and/or a change in pressure on the fourth functional layer FC4, which may be caused by a user's finger or an external object. The fourth functional layer FC4 may provide a touch surface to a user.

The input-sensing circuit ISC may be directly disposed on a thin encapsulation layer of the display panel DP. In other words, the input-sensing circuit ISC may be disposed on the display panel DP without any adhesive member interposed therebetween.

Referring to FIG. 4B, the display module DM-1 may include the display panel DP, the input-sensing circuit ISC, and a sixth adhesive member AD6. The display panel DP and the input-sensing circuit ISC may be adhered to each other by the sixth adhesive member AD6.

Figure 5:
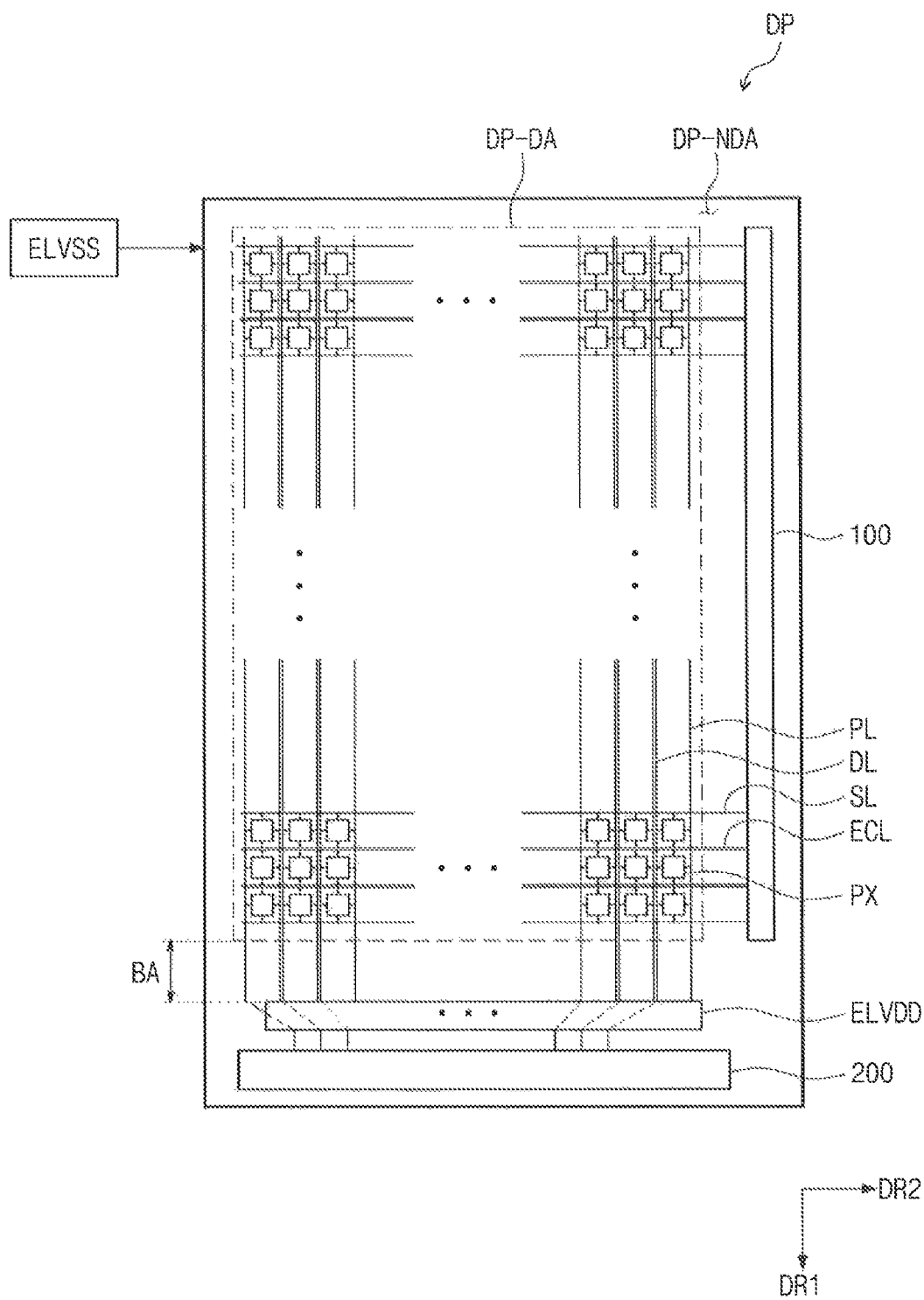
FIG. 5 is a plan view illustrating a display panel according to an exemplary embodiment of the inventive concept.

FIG. 5 is a plan view illustrating the display panel DP according to an exemplary embodiment of the inventive concept.

The display panel DP may include a display region DP-DA and a non-display region DP-NDA, when viewed in a plan view. In the present embodiment, the non-display region DP-NDA may be located along an edge or outer boundary of the display region DP-DA. The display region DP-DA and the non-display region DP-NDA of the display panel DP may correspond to the display region DD-DA and the non-display region DD-NDA, respectively, of the display device DD shown in FIG. 1.

The display panel DP may include a scan driver 100, a data driver 200, a plurality of scan lines SL, a plurality of emission control lines ECL, a plurality of data lines DL, a plurality of power lines PL, and a plurality of pixels PX. The pixels PX may be disposed in the display region DP-DA. Each of the pixels PX may include an organic light emitting element OLED (e.g., see FIG. 6) and a pixel circuit CC (e.g., see FIG. 6) connected thereto. The organic light emitting element OLED may be an organic light emitting diode.

The scan driver 100 may include a scan driving part and an emission control driving part. The scan driving part and the emission control part may be electronic circuits.

The scan driving part may generate scan signals and output the generated scan signals sequentially to the scan lines SL. The emission control driving part may generate emission control signals and output the generated emission control signals to the emission control lines ECL.

In another exemplary embodiment of the inventive concept, the scan driving part and the emission control driving part may be provided as a single circuit, not as separate elements, in the scan driver 100.

The scan driver 100 may include a plurality of thin film transistors that are formed by the same process as that for the driving circuit of the pixels PX (e.g., by a low temperature polycrystalline silicon (LTPS) process or a low temperature polycrystalline oxide (LTPO) process).

The data driver 200 may output data signals to the data lines DL. The data signals may be provided in the form of analog voltages, whose levels are determined based on gradation levels of image data.

In an exemplary embodiment of the inventive concept, the data driver 200 may be directly mounted on the display panel DP. However, the inventive concept is not limited to this example, for example, the data driver 200 may be mounted on a printed circuit board, which is electrically connected to end portions (e.g., pads) of the data lines DL.

The scan lines SL may be extended in a second direction DR2 and may be arranged in a first direction DR1 crossing the second direction DR2. In an exemplary embodiment of the inventive concept, the second direction DR2 and the first direction DR1 may be orthogonal to each other, but the inventive concept is not limited to this example.

The emission control lines ECL may be extended in the second direction DR2 and may be arranged in the first direction DR1. In other words, each of the emission control lines ECL may be arranged to be parallel to a corresponding one of the scan lines SL.

The data lines DL may be extended in the first direction DR1 and may be arranged in the second direction DR2 crossing the first direction DR1. The data lines DL may provide data signals to corresponding ones of the pixels PX.

The power lines PL may be extended in the first direction DR1 and may be arranged in the second direction DR2. The power lines PL may provide a first power ELVDD to corresponding ones of the pixels PX.

Each of the pixels PX may be coupled to a corresponding one of the scan lines SL, a corresponding one of the emission control lines ECL, a corresponding one of the data lines DL, and a corresponding one of the power lines PL.

The non-display region DP-NDA of the display panel DP may include a bending region BA. When the display panel DP is bent or folded about the bending region BA, it is possible to provide the display device DD with a thin bezel region, since an area of the non-display region DP-NDA becomes reduced on a plan view defined by the first directions DR1 and second directions DR2. In other words, it is possible to provide the display device DD of FIG. 1 with a small non-display region DD-NDA.

Figure 6:
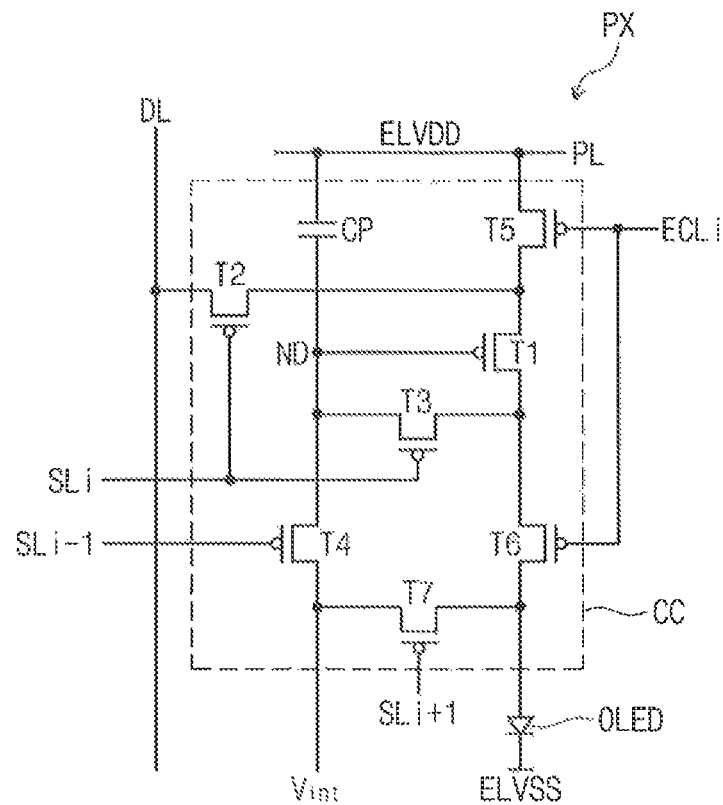
FIG. 6 is an equivalent circuit diagram of a pixel according to an exemplary embodiment of the inventive concept.
Figure 7:
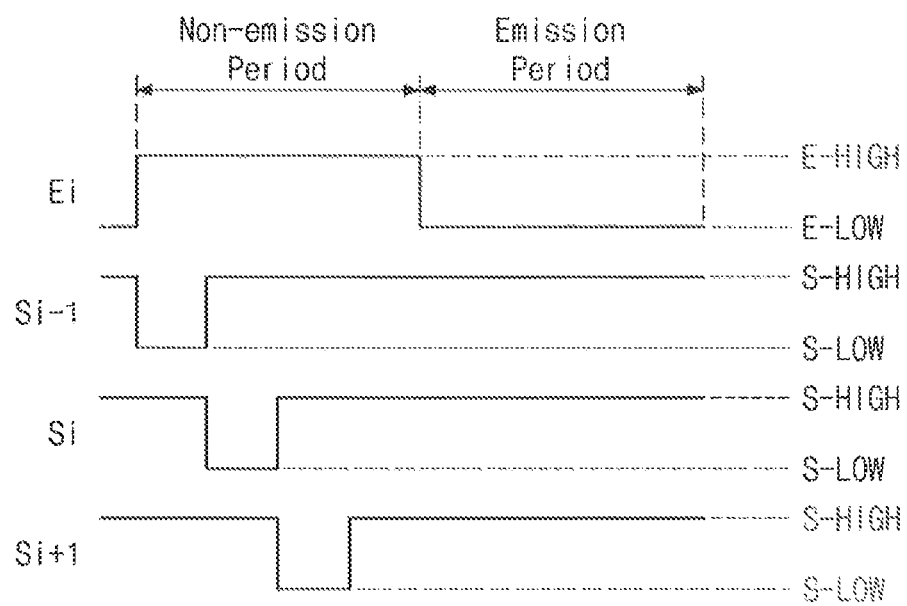
FIG. 7 is a timing diagram illustrating an example of an emission control signal and scan signals applied to the pixel of FIG. 6.

FIG. 6 is an equivalent circuit diagram of a pixel PX according to an exemplary embodiment of the inventive concept. FIG. 7 is a timing diagram illustrating an example of an emission control signal Ei and scan signals Si−1, Si, and Si+1, which are applied to the pixel PX of FIG. 6. FIG. 6 illustrates the pixel PX connected to an i-th scan line SLi and an i-th emission control line ECLi.

The pixel PX may include an organic light emitting element OLED and a pixel circuit CC. The pixel circuit CC may include a plurality of transistors T1, T2, T3, T4, T5, T6 and T7 and a capacitor CP. The pixel circuit CC may control an amount of current flowing through the organic light emitting element OLED, in response to a data signal.

The organic light emitting element OLED may emit light, whose brightness is determined by an amount of current to be supplied from the pixel circuit CC. For this, the first power ELVDD may be set to a level higher than that of a second power ELVSS.

Each of the transistors T1-T7 may include an input or source electrode, an output or drain electrode, and a control or gate electrode. In the present specification, for convenience in description, one of the input and output electrodes may be referred to as "a first electrode", and the other may be referred to as "a second electrode".

The first electrode of the first transistor T1 may be coupled to the first power ELVDD through the fifth transistor T5, and the second electrode of the first transistor T1 may be coupled to an anode electrode of the organic light emitting element OLED through the sixth transistor T6. The first transistor T1 may be referred to as "a driving transistor".

The first transistor T1 may control an amount of current flowing through the organic light emitting element OLED, in response to a voltage applied to the control electrode of the first transistor T1.

The second transistor T2 may be coupled between the data line DL and the first electrode of the first transistor T1. The control electrode of the second transistor T2 may be coupled to the i-th scan line SLi. If the i-th scan signal Si is provided to the i-th scan line SLi, the second transistor T2 may be turned on to allow the data line DL to be electrically coupled to the first electrode of the first transistor T1.

The third transistor T3 may be coupled between the second electrode and the control electrode of the first transistor T1. The control electrode of the third transistor T3 may be coupled to the i-th scan line SLi. If the i-th scan signal Si is provided to the i-th scan line SLi, the third transistor T3 may be turned on to allow the second electrode and the control electrode of the first transistor T1 to be electrically coupled to each other. Thus, if the third transistor T3 is turned on, the first transistor T1 may behave like a diode.

The fourth transistor T4 may be coupled between a node ND and an initialization power generator. The control electrode of the fourth transistor T4 may be coupled to an (i−1)-th scan line SLi−1. If an (i−1)-th scan signal Si−1 is provided to the (i−1)-th scan line SLi−1, the fourth transistor T4 may be turned on to provide an initialization voltage Vint to the node ND.

The fifth transistor T5 may be coupled between the power line PL and the first electrode of the first transistor T1. The control electrode of the fifth transistor T5 may be coupled to the i-th emission control line ECLi.

The sixth transistor T6 may be coupled between the second electrode of the first transistor T1 and the anode electrode of the organic light emitting element OLED. The control electrode of the sixth transistor T6 may be coupled to the i-th emission control line ECLi.

The seventh transistor T7 may be coupled between the initialization power generator and the anode electrode of the organic light emitting element OLED. The control electrode of the seventh transistor T7 may be coupled to an (i+1)-th scan line SLi+1. If an (i+1)-th scan signal Si+1 is provided to the (i+1)-th scan line SLi+1, the seventh transistor T7 may be turned on to provide the initialization voltage Vint to the anode electrode of the organic light emitting element OLED.

The seventh transistor T7 may improve the ability of the pixel PX to represent black. For example, if the seventh transistor T7 is turned on, a parasitic capacitance of the organic light emitting element OLED may be discharged. In this case, when it is necessary to represent black, it is possible to prevent light from being emitted from the organic light emitting element OLED due to a leakage current from the first transistor T1. Therefore, the pixel PX can display a deeper black.

In addition, although FIG. 6 illustrates an example in which the control electrode of the seventh transistor T7 is coupled to the (i+1)-th scan line SLi+1, the inventive concept is not limited thereto. In another exemplary embodiment of the inventive concept, the control electrode of the seventh transistor T7 may be coupled to the i-th scan line SLi or the (i−1)-th scan line SLi−1.

FIG. 6 illustrates an example in which p-type metal oxide semiconductor (PMOS) transistors are used as the transistors T1-T7, but the inventive concept is not limited to this example. In certain exemplary embodiments of the inventive concept, n-type metal oxide semiconductor (NMOS) transistors may be used to constitute the pixel PX. In other exemplary embodiments of the inventive concept, the pixel PX may be configured to include both NMOS and PMOS transistors.

The capacitor CP may be disposed between the power line PL and the node ND. The capacitor CP may be charged to a voltage level corresponding to the data signal. If the fifth and sixth transistors T5 and T6 are turned on, an amount of current flowing through the first transistor T1 may be determined, depending on a voltage level of the capacitor CP.

The inventive concept is not limited to the structure of the pixel PX shown in FIG. 6. In another exemplary embodiment of the inventive concept, the circuit structure of the pixel PX may be variously changed to control the light emitting operation of the organic light emitting element OLED.

Referring to FIG. 7, the emission control signal Ei may have a high level E-HIGH or a low level E-LOW. Each of the scan signals Si−1, Si, and Si+1 may have a high level S-HIGH or a low level S-LOW.

If the emission control signal Ei has the high level E-HIGH, the fifth transistor T5 and the sixth transistor T6 may be turned off. If the fifth transistor T5 is turned off, the power line PL may be electrically disconnected from the first electrode of the first transistor T1. If the sixth transistor T6 is turned off, the second electrode of the first transistor T1 may be electrically disconnected from the anode electrode of the organic light emitting element OLED. Thus, when the emission control signal Ei having the high level E-HIGH is applied to the i-th emission control line ECLi, the organic light emitting element OLED may not emit light. A time when the emission control signal Ei has the high level may be referred to as a non-emission period.

If the (i−1)-th scan signal Si−1 provided to the (i−1)-th scan line SLi−1 has the low level S-LOW, the fourth transistor T4 may be turned on. If the fourth transistor T4 is turned on, the initialization voltage Vint may be provided to the node ND.

If the i-th scan signal Si provided to the i-th scan line SLi has the low level S-LOW, the second transistor T2 and the third transistor T3 may be turned on.

If the second transistor T2 is turned on, the data signal may be provided to the first electrode of the first transistor T1. Here, since the node ND is initialized to the initialization voltage Vint, the first transistor T1 may be turned on. If the first transistor T1 is turned on, a voltage corresponding to the data signal may be provided to the node ND. Thus, the capacitor CP may be charged by the voltage corresponding to the data signal.

If the (i+1)-th scan signal Si+1 provided to the (i+1)-th scan line SLi+1 has the low level S-LOW, the seventh transistor T7 may be turned on.

If the seventh transistor T7 is turned on, the initialization voltage Vint may be applied to the anode electrode of the organic light emitting element OLED to allow a parasitic capacitance of the organic light emitting element OLED to be discharged.

If the emission control signal Ei provided to the emission control line ECLi has the low level E-LOW, the fifth transistor T5 and the sixth transistor T6 may be turned on. If the fifth transistor T5 is turned on, the first power ELVDD may be provided to the first electrode of the first transistor T1. If the sixth transistor T6 is turned on, the second electrode of the first transistor T1 may be electrically coupled to the anode electrode of the organic light emitting element OLED. In this case, the organic light emitting element OLED may emit light. Brightness of the light emitted from the organic light emitting element OLED may be determined by an amount of current provided to the organic light emitting element OLED. A time when the emission control signal Ei has the low level may be referred to as an emission period.

Figure 8:
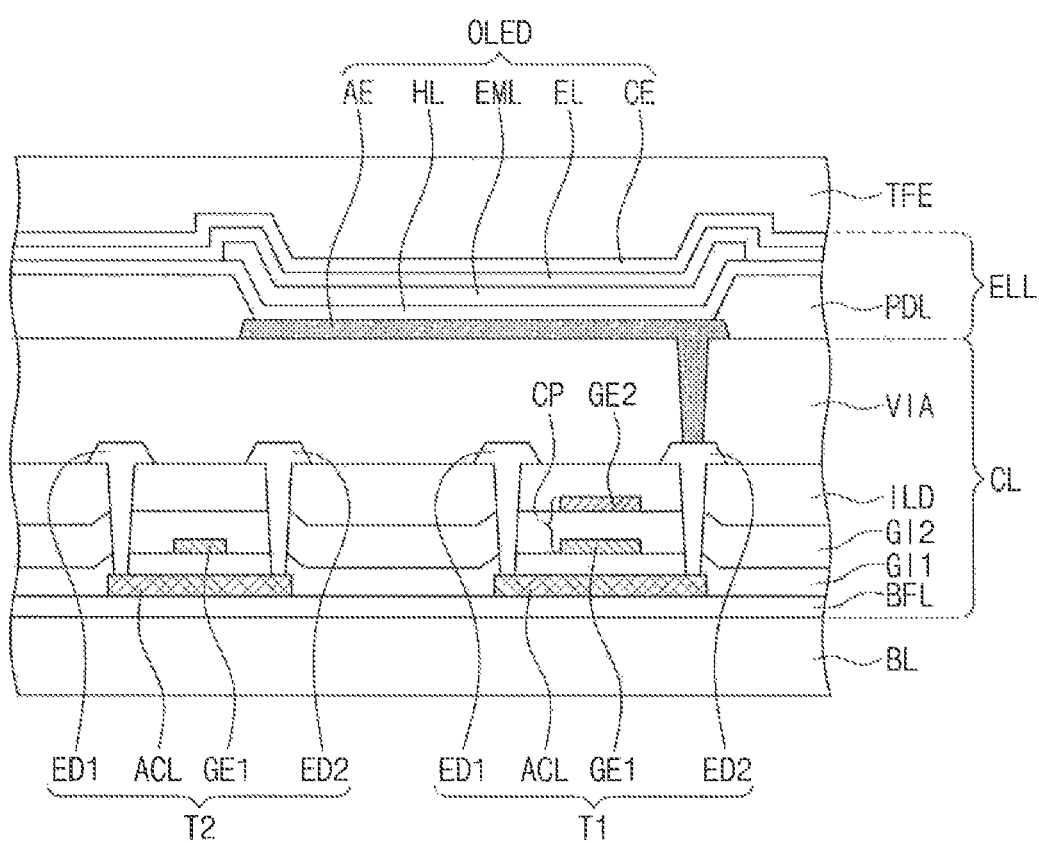
FIG. 8 is a sectional view illustrating a portion of a pixel according to an exemplary embodiment of the inventive concept.

FIG. 8 is a sectional view illustrating a portion of the pixel PX (e.g., of FIG. 6) according to an exemplary embodiment of the inventive concept. FIG. 8 illustrates example structures of the first transistor T1 and the second transistor T2, but structures of the first transistor T1 and the second transistor T2 are not limited to these examples. In order to reduce complexity in the sectional view, a second electrode ED2 of the first transistor T1 in FIG. 8 is illustrated to be in direct contact with an anode electrode AE of the pixel PX, but in reality, the first transistor T1 may be connected to the anode electrode AE of the pixel PX through the sixth transistor T6, as shown in FIG. 6. The inventive concept is not limited to this example, and in another exemplary embodiment of the inventive concept, the second electrode ED2 of the first transistor T1 may actually be in direct contact with the anode electrode AE of the pixel PX.

The display panel DP (e.g., see FIG. 5) may include a base layer BL, a circuit layer CL, a light emitting element layer ELL, and an encapsulation layer TFE.

The circuit layer CL may include a buffer layer BFL, gate insulating layers GI1 and GI2, an interlayered insulating layer ILD, a circuit insulating layer VIA, and transistors T1 and T2.

The light emitting element layer ELL may include an organic light emitting element OLED and a pixel definition layer PDL.

The encapsulation layer TFE may seal the light emitting element layer ELL and may protect the light emitting element layer ELL from external oxygen or moisture.

The buffer layer BFL may be disposed on a surface of the base layer BL.

The buffer layer BFL may prevent a contaminant in the base layer BL from entering the pixel PX during the fabrication process. For example, the buffer layer BFL may prevent the contaminant from being diffused into active portions ACL of the transistors T1 and T2 constituting the pixel PX.

The contaminant or contamination material may be provided from the outside or may be produced when a thermal process is performed on the base layer BL. For example, the contamination material may be gas or sodium, which is exhausted from the base layer BL. In addition, the buffer layer BFL may prevent external moisture from entering the pixel PX.

The active portions ACL constituting the transistors T1 and T2 may be provided on the buffer layer BFL. Each of the active portions ACL may be formed of or include poly silicon or amorphous silicon. In certain embodiments of the inventive concept, the active portions ACL may be formed of or include at least one of a plurality of metal oxide semiconductor materials.

Each of the active portions ACL may include a channel region, which is used as a conduction path for electrons or holes, and a first doped region and a second doped region, which are spaced apart from each other with the channel region interposed therebetween.

A first gate insulating layer GI1 may be disposed on the buffer layer BFL to cover the active portions ACL. The first gate insulating layer GI1 may include an organic layer and/or an inorganic layer. In an exemplary embodiment of the inventive concept, the first gate insulating layer GI1 may include a plurality of inorganic layers. The plurality of inorganic layers may include a silicon nitride layer and a silicon oxide layer.

The transistors T1 and T2 may include control electrodes GE1 that are provided on the first gate insulating layer GI1. The control electrode GE1 of the first transistor T1 may be one of two electrodes constituting the capacitor CP. At least a portion of the scan and emission control lines SL and ECL (e.g., see FIG. 5) may be disposed on the first gate insulating layer GI1.

A second gate insulating layer GI2 may be disposed on the first gate insulating layer GI1 to cover the control electrodes GE1. The second gate insulating layer GI2 may include an organic layer and/or an inorganic layer. The second gate insulating layer GI2 may include a plurality of inorganic layers. The plurality of inorganic layers may include a silicon nitride layer and a silicon oxide layer.

An electrode GE2, which is used as the other of the two electrodes constituting the capacitor CP (e.g., see FIG. 6), may be disposed on the second gate insulating layer GI2. In other words, the control electrode GE1 on the first gate insulating layer GI1 and the electrode GE2 on the second gate insulating layer GI2 may be overlapped with each other to constitute the capacitor CP of FIG. 6. However, the inventive concept is not limited to the above structure of the electrodes GE1 and GE2 constituting the capacitor CP.

The interlayered insulating layer ILD may be disposed on the second gate insulating layer GI2 to cover the electrode GE2. The interlayered insulating layer ILD may include an organic layer and/or an inorganic layer. The interlayered insulating layer ILD may include a plurality of inorganic layers. The plurality of inorganic layers may include a silicon nitride layer and a silicon oxide layer.

At least one portion of the data line DL (e.g., see FIG. 5) and the power line PL (e.g., see FIG. 5) may be disposed on the interlayered insulating layer ILD. First electrodes ED1 and second electrodes ED2 of each of the transistors T1 and T2 may be disposed on the interlayered insulating layer ILD.

The first electrodes ED1 and the second electrodes ED2 may be connected to corresponding portions of the active portions ACL through penetration holes, which penetrate the gate insulating layers GI1 and GI2 and the interlayered insulating layer ILD.

The circuit insulating layer VIA may be disposed on the interlayered insulating layer ILD to cover the first electrodes ED1 and the second electrodes ED2. The circuit insulating layer VIA may include an organic layer and/or an inorganic layer. The circuit insulating layer VIA may provide a flat surface.

The pixel definition layer PDL and the organic light emitting element OLED may be disposed on the circuit insulating layer VIA.

The organic light emitting element OLED may include the anode electrode AE, a hole control layer HL, an emission layer EML, an electron control layer EL, and a cathode electrode CE.

Figure 9:
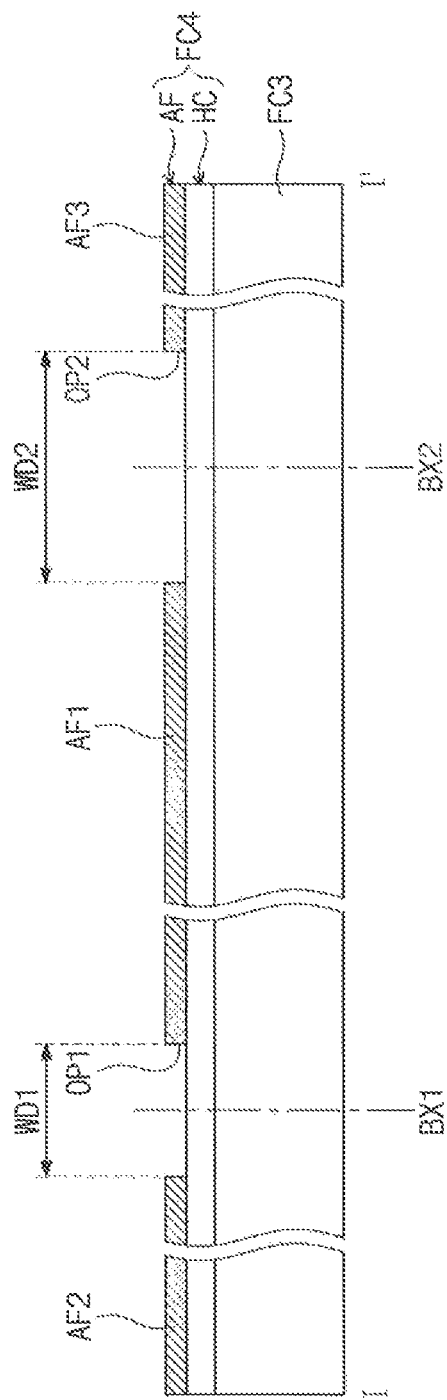
FIG. 9 is a sectional view illustrating example portions of the display device of FIG. 1, taken along line I-I' of FIG. 1.

FIG. 9 is a sectional view illustrating some portions of the display device of FIG. 1, taken along line I-I' of FIG. 1.

Referring to FIG. 9, the fourth functional layer FC4 may include a hard coating layer HC and an anti-fingerprint layer AF.

The hard coating layer HC may be disposed on a surface of the third functional layer FC3 to protect the surface of the third functional layer FC3. The hard coating layer HC may be formed through a coating process performed on the third functional layer FC3. For example, the hard coating layer HC may directly contact the third functional layer FC3.

In an exemplary embodiment of the inventive concept, the hard coating layer HC may include polyimide, but the inventive concept is not limited to this example. The hard coating layer HC may be formed of a material whose hardness is high enough to protect the surface of the third functional layer FC3.

In another exemplary embodiment of the inventive concept, the hard coating layer HC of the fourth functional layer FC4 may be omitted. For example, when the third functional layer FC3 includes glass, the surface of the third functional layer FC3 may have a sufficiently high hardness, and thus, the hard coating layer HC may be omitted.

The anti-fingerprint layer AF may be formed through a coating process, which is performed on the hard coating layer HC or the third functional layer FC3, and may have a thickness ranging from 1 nm to 100 nm. However, the thickness of the anti-fingerprint layer AF may not be limited to this range and may be changed.

The anti-fingerprint layer AF may constitute the outermost surface of the display device DD and may include a hydrophobic material.

When the anti-fingerprint layer AF is not provided and the third functional layer FC3 and the hard coating layer HC include a hydrophilic material, a fingerprint-induced stain may be easily formed on a surface of the display device DD. Thus, in the case where the anti-fingerprint layer AF including the hydrophobic material is provided as the outermost part of the display device DD, it is possible to prevent or suppress the surface of the display device DD from being stained with a user's fingerprint.

For example, the hydrophobic material may include a fluorine compound, however, the inventive concept is not limited to this example.

A first opening OP1 corresponding to the first bending axis BX1 and a second opening OP2 corresponding to the second bending axis BX2 may be provided in the anti-fingerprint layer AF. Based on positions of the first opening OP1 and the second opening OP2, the anti-fingerprint layer AF may be divided into a first portion AF1, a second portion AF2, and a third portion AF3.

The first portion AF1 of the anti-fingerprint layer AF may be overlapped with the first display region DA1 (e.g., see FIG. 1), the second portion AF2 of the anti-fingerprint layer AF may be overlapped with the second display region DA2 (e.g., see FIG. 1), and the third portion AF3 of the anti-fingerprint layer AF may be overlapped with the third display region DA3 (e.g., see FIG. 1).

A width WD1 (hereinafter, a first width) of the first opening OP1 may correspond to a distance between the first portion AF1 and the second portion AF2. A width WD2 (hereinafter, a second width) of the second opening OP2 may correspond to a distance between the first portion AF1 and the third portion AF3.

The first width WD1 may be within the range given by the following formula 1.

$$\pi \times R1 + 4 \text{ mm} \leq WD1 \leq \pi \times R1 + 8 \text{ mm, where } R1 \text{ is a first curvature radius in mm.} \quad \text{[Formula 1]}$$

According to the formula 1, the first width WD1 may be larger, by 4 mm to 8 mm, than half a circumference length of a circle whose radius is the first curvature radius R1.

If the first width WD1 is less than a length of ($\pi \times R1+4$ mm), a portion of at least one of the first portion AF1 of the anti-fingerprint layer AF or the second portion AF2 of the anti-fingerprint layer AF may be delaminated by a stress to be exerted thereto during a folding operation. If the first width WD1 is larger than a length of ($\pi \times R1+8$ mm), a fingerprint-induced stain may occur on an outer surface of the display device DD.

The second width WD2 may be within the range given by the following formula 2.

$$\pi \times R2 + 4 \text{ mm} \leq WD2 \leq \pi \times R2 + 8 \text{ mm, where } R2 \text{ is a second curvature radius in mm.} \quad \text{[Formula 2]}$$

According to the formula 2, the second width WD2 may be larger, by 4 mm to 8 mm, than half a circumference length of a circle, whose radius is the second curvature radius R2.

If the second width WD2 is less than a length of ($\pi \times R2+4$ mm), a portion of at least one of the first portion AF1 of the anti-fingerprint layer AF or the third portion AF3 of the anti-fingerprint layer AF may be delaminated by a stress to be exerted thereto during a folding operation. If the second width WD2 is larger than a length of ($\pi \times R2+8$ mm), a fingerprint-induced stain may occur on the outer surface of the display device DD.

In an exemplary embodiment of the inventive concept, since the second curvature radius R2 is larger than the first curvature radius R1, the second width WD2 may be larger than the first width WD1.

Since, as shown in FIG. 9, the anti-fingerprint layer AF having the hydrophobic property is not formed on the portions corresponding to the bending axes BX1 and BX2, it is possible to increase an adhesive strength between portions exposed by the first opening OP1 and the second opening OP2 and a protection film additionally attached by a user.

According to an exemplary embodiment of the inventive concept, it is possible to prevent a delamination phenomenon from occurring between a protection film, which is additionally attached to a top surface of a window by a user, and a bending axis portion of a foldable display device. This is so, for example, because the inventive concept increases an adhesive strength between the outermost surface of a foldable portion of a display device and an external film.

While the inventive concept has been particularly shown and described with reference to exemplary embodiments thereof, it will be understood by one of ordinary skill in the art that variations in form and detail may be made thereto without departing from the spirit and scope of the inventive concept as defined by the attached claims.

What is claimed is:

1. A display device, comprising:
a display panel configured to be folded about a first bending axis;
a window member disposed on the display panel, the window member including a transparent material; and
a functional layer disposed on the window member, the functional layer including a hydrophobic material and a first opening at a region corresponding to the first bending axis,
wherein the first opening has a width given by mathematical formula 1:

$$\pi \times R1+4 \text{ mm} \leq WD1 \leq \pi \times R1+8 \text{ mm},$$ [Formula 1]

where WD1 is the width of the first opening, R1 is a first curvature radius of a portion of the display panel adjacent to the first bending axis when the display panel is folded about the first bending axis, and lengths of R1 and WD1 are in millimeters,
the width of the first opening being larger, by 4 mm to 8 mm, than half a circumference of a circle whose radius is the first curvature radius.

2. The display device of claim 1, wherein the hydrophobic material is a fluorine compound.

3. The display device of claim 2, further comprising a hard coating layer between the functional layer and the window member, wherein the hard coating layer includes polyimide.

4. The display device of claim 2, wherein the display panel is configured to be folded about a second bending axis spaced apart from the first bending axis, and the functional layer includes a second opening at a region corresponding to the second bending axis.

5. The display device of claim 4, wherein the display panel, which is folded about the first bending axis, has the first curvature radius near the first bending axis,
the display panel, which is folded about the second bending axis, has a second curvature radius near the second bending axis, and
the second opening has a second width which is given by mathematical formula 2, $$\pi \times R2+4 \text{ mm} \leq WD2 \leq \pi \times R2+8 \text{ mm},$$ [Formula 2]

where R2 is the second curvature radius in millimeters and WD2 is the second width in millimeters.

6. The display device of claim 5, wherein the second curvature radius is larger than the first curvature radius, and the second width is larger than the first width.

7. The display device of claim 2, wherein the display panel comprises an organic light emitting element.

8. The display device of claim 2, further comprising an input-sensing circuit disposed between the display panel and the window member and configured to sense a touch event applied from outside the display device, wherein the functional layer provides a touch surface at which the touch event occurs.

9. The display, device of claim 2, further comprising an impact absorption member disposed below the display panel.

10. A display device, comprising:
a display panel comprising a first display region, a second display region extended from a first side of the first display region, and a third display region extended from a second side of the first display region opposite the first side, the display panel configured to be folded about a first bending axis between the first display region and the second display region and about a second bending axis between the first display region and the third display region;
a window member disposed on the display panel, the window member including a transparent material; and
a functional layer disposed on the window member, the functional layer including a hydrophobic material, a first portion overlapped with the first display region, a second portion overlapped with the second display region, and a third portion overlapped with the third display region, wherein the functional layer is not overlapped with the first bending axis and the second bending axis,
wherein the display panel is folded at a first curvature radius about the first bending axis,
wherein the first portion of the functional layer and the second portion of the functional layer are spaced apart from each other by a first distance
wherein the first distance satisfies following formula 1, $$\pi \times R1+4 \text{ mm} \leq WD1 \leq \pi \times R1+8 \text{ mm},$$ [Formula 1]

where R1 is the first curvature radius in mm and WD1 is the first distance in mm,
the first distance being larger, by 4 mm to 8 mm, than half a circumference of a circle whose radius is the first curvature radius.

11. The display device of claim 10, further comprising an input-sensing circuit disposed between the display panel and the window member to sense a ouch event caused by an external object, wherein the functional layer provides a touch surface on which the touch event occurs.

12. The display device of claim 11, wherein the hydrophobic material is a fluorine con pound.

13. The display device of claim 12, further comprising a hard coating layer disposed between the functional layer and the window member, wherein the hard coating layer includes polyimide.

14. The display device of claim 12, wherein the display panel is folded at a second curvature radius, which is larger than the first curvature radius, about the second bending axis,
and
the first portion of the functional layer and the third portion of the functional layer are spaced apart from each other by a second distance larger than the first distance.

15. The display device of claim 14, wherein the second distance satisfies following formula 2, $$\pi \times R2+4 \text{ mm} \leq WD2 \leq \pi \times R2+8 \text{ mm},$$ [Formula 2]

where R2 is the second curvature radius in mm and WD2 is the second distance in mm.

16. The display device of claim 15, wherein the display panel is folded such that the first display region and the second display region face each other or such that the first display region and the third display region face each other.

17. The display device of claim 12, wherein the display panel comprises an organic light emitting element.

18. The display device of claim 12, wherein the functional layer has a thickness ranging from 1 nm to 100 nm.

19. The display device of claim 12, further comprising an impact absorption member disposed below the display panel.

* * * * *